(12) United States Patent
Sawai

(10) Patent No.: US 6,511,085 B2
(45) Date of Patent: Jan. 28, 2003

(54) VEHICLE SUSPENSION APPARATUS

(75) Inventor: Seiji Sawai, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/745,348

(22) Filed: Dec. 21, 2000

(65) Prior Publication Data

US 2001/0006269 A1 Jul. 5, 2001

(30) Foreign Application Priority Data

Dec. 24, 1999 (JP) .......................................... 11-366107

(51) Int. Cl.[7] .......................... B60G 9/04; B60G 11/30; B60G 21/06
(52) U.S. Cl. ....................... 280/124.157; 280/124.161; 267/186
(58) Field of Search ................ 280/124.157, 124.11, 280/124.111, 124.112, 124.158, 124.159, 124.16, 124.161; 267/186

(56) References Cited

U.S. PATENT DOCUMENTS

| | | | | |
|---|---|---|---|---|
| 3,141,659 A | * | 7/1964 | Lyon, Jr. | 267/186 |
| 3,273,876 A | * | 9/1966 | Hannan | 267/186 |
| 3,480,269 A | * | 11/1969 | Jewell et al. | 267/64 |
| 3,533,425 A | * | 10/1970 | Hannan | 137/46 |
| 3,941,403 A | * | 3/1976 | Hiruma | 280/124 |
| 4,010,829 A | * | 3/1977 | Naito et al. | 188/278 |
| 4,061,320 A | * | 12/1977 | Warner | 267/64.15 |
| 5,125,681 A | * | 6/1992 | Brackette, Jr. | 280/707 |
| 5,522,484 A | | 6/1996 | Sawai | 188/299 |
| 5,547,211 A | * | 8/1996 | Runkel | 280/708 |
| 5,707,044 A | * | 1/1998 | Le Gourvellec et al. | 267/64.16 |
| 5,772,224 A | | 6/1998 | Tong | 280/112.2 |
| 5,810,128 A | | 9/1998 | Eriksson et al. | 188/289 |
| 5,984,059 A | | 11/1999 | Kurachi et al. | 188/318 |
| 6,024,366 A | * | 2/2000 | Masamura | 280/124.162 |

FOREIGN PATENT DOCUMENTS

| | | |
|---|---|---|
| EP | 0 702 166 A1 | 3/1996 |
| EP | 0 695 658 A2 | 7/1996 |
| EP | 1 110 768 A1 | 6/2001 |
| GB | 1 341 123 | 12/1973 |

OTHER PUBLICATIONS

Co–pending patent application: Ser. No. 08/855,104, filed May 13, 1997, entitled Hydraulic Shock Absorbers, in the name of Masahiro Satou, and assigned to Yamaha Hatsudoki Kabushiki Kaisha.

* cited by examiner

Primary Examiner—Paul Dickson
Assistant Examiner—Laura B. Rosenberg
(74) Attorney, Agent, or Firm—Knobbe, Martens, Olson & Bear, LLP

(57) ABSTRACT

A vehicle suspension system including a first and second hydraulic damper is provided. Each hydraulic damper is provided with a cylinder and a piston connected to one end of a hollow piston rod, such that the pistons freely slide in the cylinder. The system also includes a pressure regulator, which has a first and second oil chamber connected to the first and second hydraulic dampers, respectively. The system additionally comprises a sub-piston and another piston connected to the sub-piston, which slidably engage in the hollow piston rod, forming an oil chamber.

32 Claims, 4 Drawing Sheets

VEHICLE SUSPENSION APPARATUS

BACKGROUND OF THE INVENTION

1. Field of the Invention

The present invention generally relates to vehicle suspension systems. More specifically, the present invention relates to vehicle suspension systems comprising hydraulic dampers interrelated through pressure regulators of reduced storage capacity.

2. Related Art

Land vehicles often comprise a chassis that is supported by a set of wheels. In some land vehicles, the chassis is supported by other members, such as skis or the like. The supporting members, whether they are wheels, skis or other configurations, often are connected to the chassis through a shock absorbing member. For instance, the chassis may be considered an unsprung mass while the supporting members comprise sprung members.

In a specific application, such as an automobile, the chassis is supported by a front right wheel, a front left wheel, a rear right wheel and a rear left wheel. The wheels are supported by springs and a shock absorber or other damping member extends between the wheel and the chassis. The purpose of the shock absorber or other damping member is to attenuate or slow the relative movement between the wheel and the chassis.

In some arrangements, the damping member of two or more wheels can be interrelated. By interrelating the damping members, the movement of the respective wheels can be used to impact the damping of each of the other interrelated wheels. For instance, in an ordinary interrelated configuration, a pair of hydraulic shock absorbers are connected through a pressure regulator. If the wheels are displaced in the same direction by approximately the same amount, then the shock absorbers provide the damping for the respective forces. If the wheels are otherwise displaced, then the shock absorbers and the pressure regulator provide the desired damping forces.

One known arrangement is illustrated rather schematically in FIG. 1. The illustrated arrangement comprises a right hydraulic damper 10 and a left hydraulic damper 12. The two hydraulic dampers 10, 12 are interrelated through a pressure regulator 14. Each hydraulic damper 10, 12 comprises a cylinder 16, 18 in which a piston 20, 22 is freely slideable. In the illustrated arrangement, the pistons 20, 22 are mounted to a top end the respective one of a set of piston rods 24, 26 The piston rods can be inserted from a lower end of the cylinders 16, 18 such that the piston rods 24, 26 would be fixed to the respective wheels and the cylinders 16, 18 would be fixed to the chassis.

The interior of the cylinders 16, 18 are divided with the respective pistons 20, 22 into upper oil chambers 28, 30 and lower oil chambers 32, 34, both of which preferably are filled with suitable fluid, such as oil for instance. The pistons 20, 22 each comprise at least one communication passage 36, 38, which are provided with corresponding throttles 40, 42. The passage 36 places the upper oil chamber 28 in communication with the lower oil chamber 32 and the passage 38 places the upper oil chamber 30 in communication with the lower oil chamber 34. The throttles 40, 42 control the flow rate between the respective chambers and generates the damping force for each of the dampers 10, 12.

As described above, the dampers 10, 12 are interrelated through a pressure regulator 14. In the illustrated arrangement, the pressure regulator 14 comprises a pair of mutually communicating cylinders 46, 48. A piston 50 is inserted in one of the cylinders 46 and a second piston 52 is inserted in the other of the cylinders 48. The two pistons 50, 52 are connected with a connecting rod 54. The connecting rod 54 assures that movement of one of the pistons 50, 52 will cause movement of the other of the pistons 50, 52.

The pistons 50, 52 divide the inside of the cylinders 46, 48 into a pair of upper chambers 56, 58 and a lower chamber 60. The upper chamber 56, 58 preferably are filled with the same fluid as is used in the hydraulic dampers 10, 12 while the lower chamber preferably is filled with an inert gas. As illustrated, the upper chambers 56, 58 are in fluid communication with at least one of the oil chambers of the respective dampers 10, 12.

Functionally, when the vehicle encounters bumps or other surface irregularities over which the vehicle is being operated, the piston rods 24, 26 either extend or contract with respect to the corresponding cylinder 16, 18. The movement of the piston rods 24, 26 causes a displacement of the pistons 20, 22 which slide inside the cylinders 16, 18 and which change the relative volumes of the associated upper chambers 28, 30 and the lower chambers 32, 34. As the pistons 20, 22 slide, oil passes through the throttles 40, 42 provided in the communication passage 36, 38 of the pistons 20, 22 to produce a damping force which attenuates oscillation of the vehicle chassis. Furthermore, an amount of oil in the cylinders 16, 18 is displaced by a volume defined by the associated piston rods 24, 26. The displaced oil is transferred through relief lines 62, 64 to the pressure regulator 14 where the change in the oil volume is balanced by the compression or expansion of the gas in the gas chamber 60 caused by the sliding movement of the free pistons 50, 52 of the pressure regulator 14.

In one configuration, one in which the diameter of the piston rod of each hydraulic damper is great, the amount of displaced oil caused by movement of the piston rod into and out of the cylinder is great. Thus, the pressure regulator must accommodate rather large volumes of oil. This results not only in the increase in size, weight and cost of the pressure regulator but also increases the difficulty associated with properly positioning and mounting the pressure regulator on the vehicle.

SUMMARY OF THE INVENTION

Accordingly, a vehicle suspension system is desired that reduces the overall size, weight and resultant cost of the pressure regulator and that increases the degree of freedom in positioning and mounting the pressure regulator on a vehicle.

Accordingly, one aspect of the present invention comprises a vehicle suspension system comprising a first hydraulic damper and a second hydraulic damper. The first hydraulic damper comprises a first inner cylinder and a first outer cylinder. The first inner cylinder and said first outer cylinder are arranged coaxially. The second hydraulic damper comprises a second inner cylinder and a second outer cylinder. The second inner cylinder and said second outer cylinder are arranged coaxially. A first piston rod is at least partially positioned within said first inner cylinder. A second piston rod is at least partially positioned within said second inner cylinder. A first sub-piston is at least partially disposed within said first piston rod. A first piston rod chamber is defined by at least a portion of said first piston rod and said first sub-piston rod. A second sub-piston is at least partially disposed within said second piston rod. A second piston rod chamber is defined by at least a portion of said second piston rod and said second sub-piston rod. A pressure regulator comprises a first chamber and second chamber with said first chamber being in fluid communication with said first piston rod chamber and said second chamber being in fluid communication with said second piston rod chamber.

Another aspect of the present invention involves a vehicle suspension system. The system comprises a first hydraulic damper comprising a first inner cylinder and a first outer cylinder. A first piston is slidably engaged in said first inner cylinder. A first hollow piston rod is connected to one end of said first piston. A first sub-piston rod and a first sub-piston formed on said first sub-piston rod are disposed at least partially within said first piston rod. A first elongate chamber is defined within said first piston rod. A second hydraulic damper comprises a second inner cylinder and a second outer cylinder. A second piston is slidably engaged in said second inner cylinder. A second hollow piston rod is connected to one end of said second piston. A second sub-piston rod and a second sub-piston formed on said second sub-piston rod are disposed at least partially within said second piston rod. A second elongate chamber is defined within said second piston rod. A pressure regulator comprises a first pressure chamber and a second pressure chamber. The first pressure chamber is connected to said first elongate chamber and the second pressure chamber is connected to said second elongate chamber.

A further aspect of the present invention involves a damper for a suspension system. The damper comprises an outer cylinder housing. A first chamber, a second chamber, and a third chamber are defined within said outer cylinder. The first chamber has a smaller volume than said second chamber and said third chamber. The third chamber extends around at least a portion of said second chamber and a valved passage places said second chamber and said third chamber in selective fluid communication with each other.

Yet another aspect of the present invention involves a damper comprising a cylinder and a piston slideably disposed within said cylinder. The piston divides said cylinder into an upper chamber and a lower chamber. A piston rod is connected to said piston and is at least partially positioned within said upper chamber. The piston rod comprises an axial passageway such that said piston rod is substantially hollow. A sub piston rod is at least partially disposed in said lower chamber and extends into said axial passageway of said piston rod. A sub piston is disposed along said piston rod. An elongate chamber is at least partially defined within said piston rod by said sub piston. A sub chamber is in fluid communication with said lower chamber.

BRIEF DESCRIPTION OF THE DRAWINGS

These and other features, aspects and advantages of the present invention will now be described with reference to the drawings of a preferred embodiment, which embodiment is intended to illustrate and not to limit the invention. There are five figures, of which FIG. 1 has been described above.

DETAILED DESCRIPTION OF THE PREFERRED EMBODIMENTS OF THE INVENTION

Figure 1:
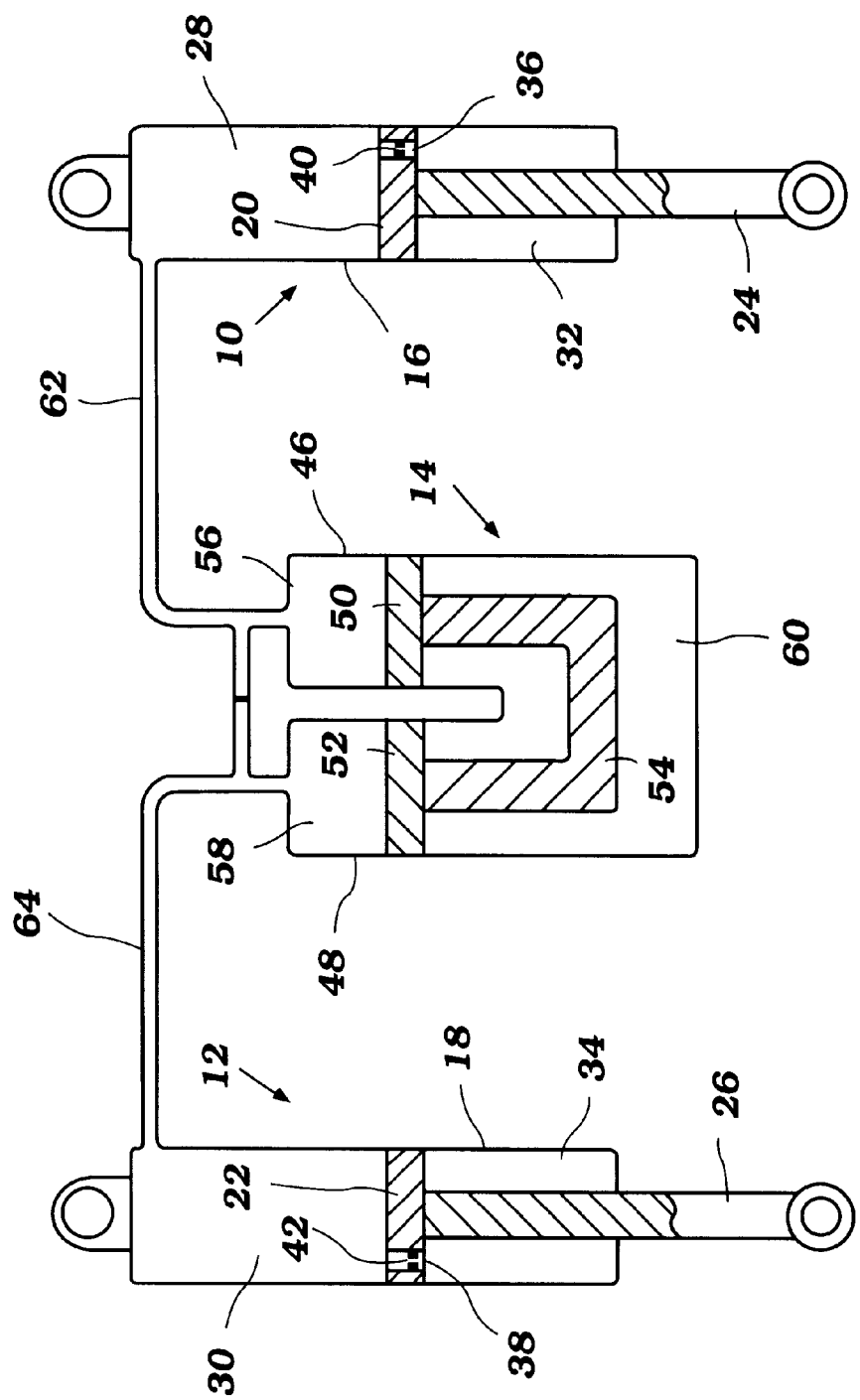
FIG. 1, described above, illustrates a schematic cross section of a conventional vehicle suspension system.
Figure 2:
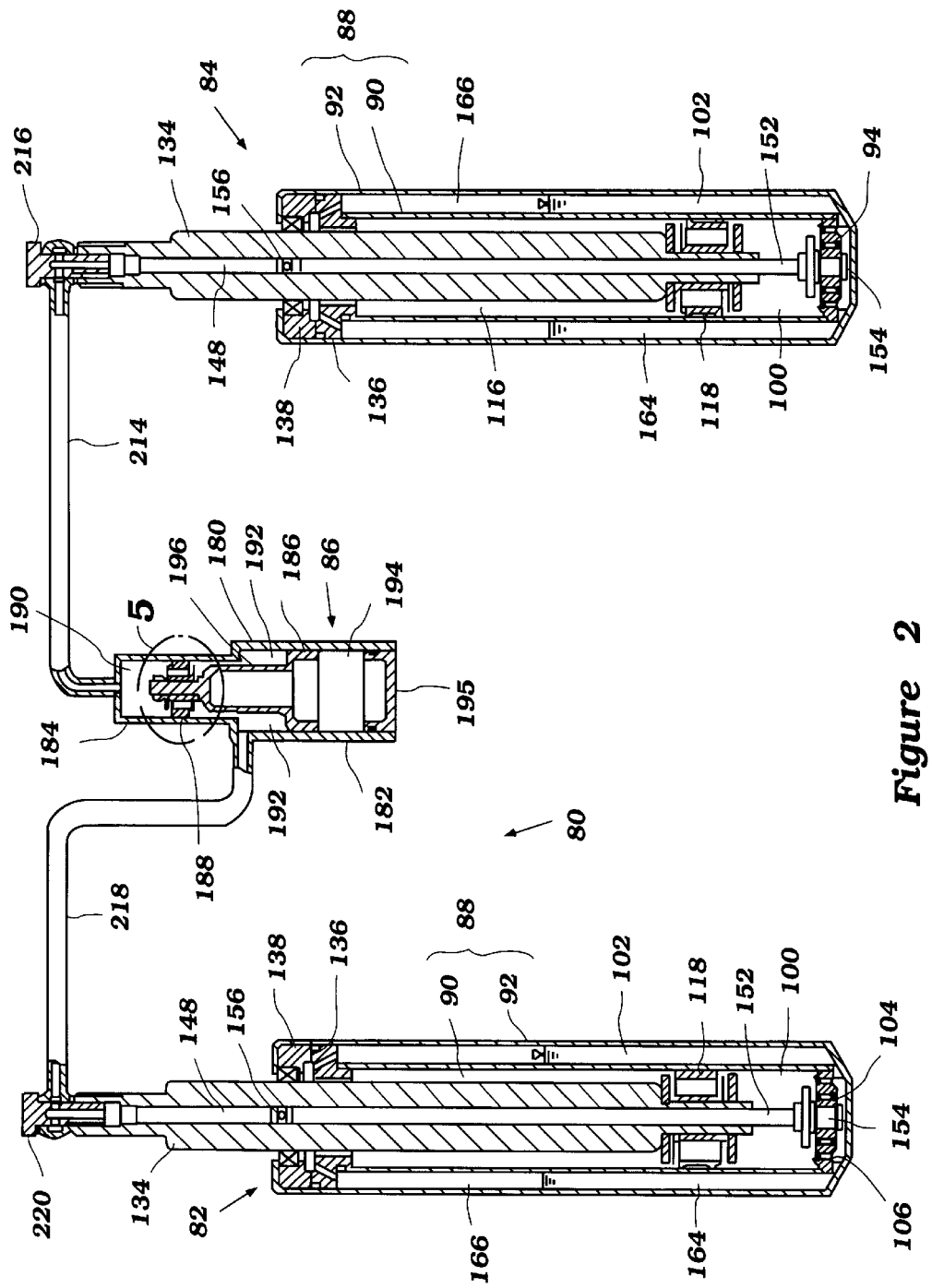
FIG. 2 is a schematic cross section of the overall construction of a vehicle suspension system having certain features, aspects and advantages of the present invention.

With reference now to FIG. 2, a vehicle suspension system 80 having certain features, aspects and advantages in accordance with the present invention is illustrated therein. While the illustrated arrangement is described as being used for suspending the right and left wheels of a four-wheeled vehicle such as an automobile, it is anticipated that any pair of wheels can be interrelated in a similar manner. The illustrated arrangement features a left hydraulic damper 82, a right hydraulic damper 84 and a pressure regulator 86.

While the illustrated arrangement features a pair of hydraulic dampers, three, four or more hydraulic dampers can be interrelated in any suitable manner. Moreover, to simplify the following description, a single damper, the left damper 82 will be described. In the presently preferred arrangement, the left damper 82 and the right damper 84 are substantially identical. Accordingly, the description of the left damper 82 generally will apply to the right damper 84 and like elements will receive like reference numerals.

It will be understood from the following discussion that the illustrated dampers are desirably double acting. For instance, a pair of pistons are provided in each damper. The dampers preferably operate such that a portion of the fluid contained within the damper is discharged to a chamber external to the damper which another portion of the fluid contained within the damper is discharged into a chamber internal to the damper, which results in compression of a gas within that chamber. In addition, it will be understood that a pair of pistons in each damper preferably move in relatively opposite directions. Such an arrangement results in an advantageously simple construction while making excellent use of space within the damper.

Figure 3:
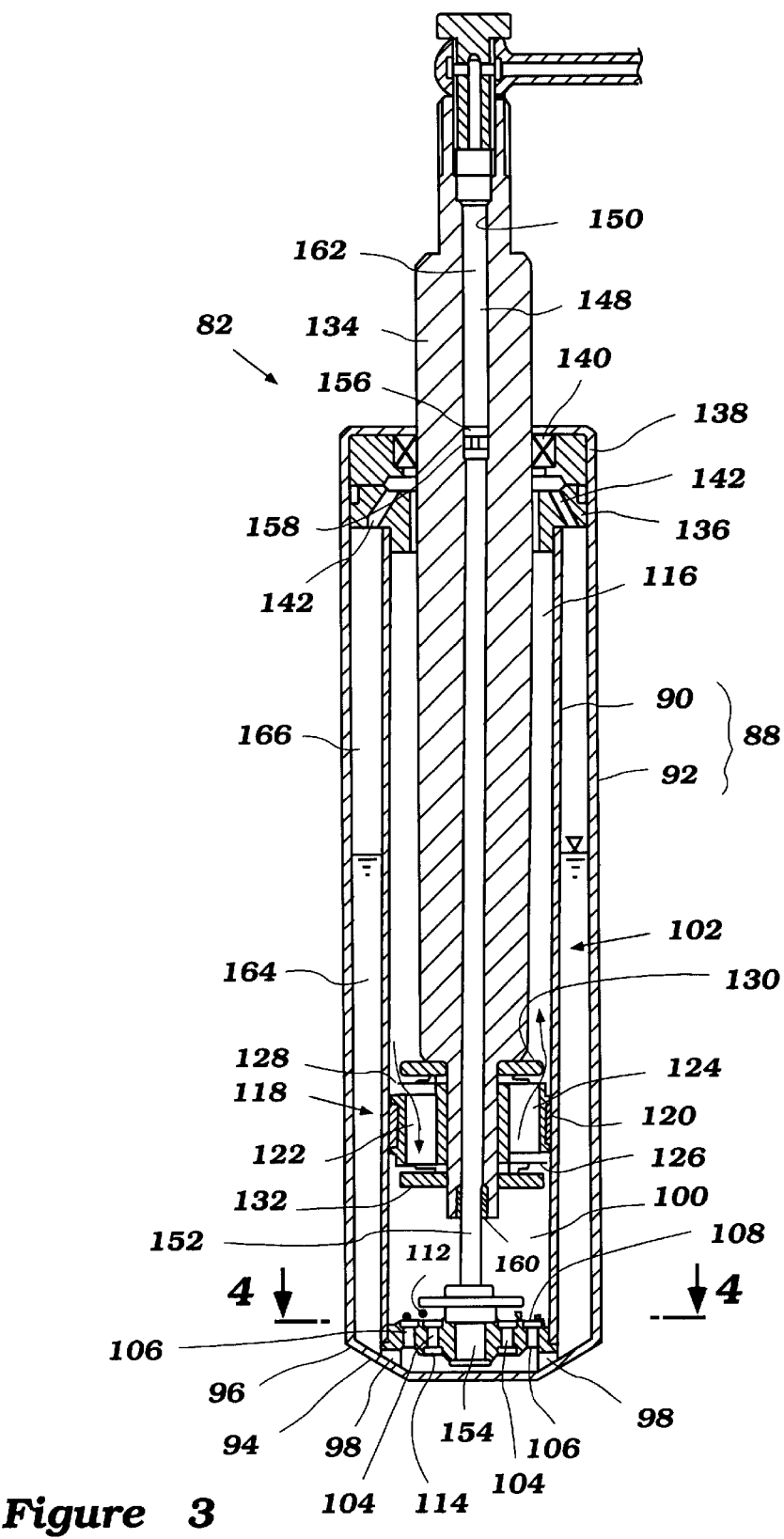
FIG. 3 is a cross sectional view of a hydraulic damper of the vehicle suspension system of FIG. 2.

With reference now to FIG. 3, the illustrated hydraulic damper 82 generally comprises a cylinder 88, which itself comprises an inner cylinder 90 and an outer cylinder 92. Preferably, the inner cylinder 90 and the outer cylinder 92 are symmetrically shaped and, more preferably, the inner cylinder 90 and outer cylinder 92 are substantially cylindrical and are substantially coaxial.

A bottom plate 94 is disposed at or near a lower end of the inner cylinder 90. Preferably, the bottom plate 94 is sized and configured to slide partially into the inner cylinder 90. In the illustrated arrangement, the bottom plate 94 comprises a relatively flat plate member and an upstanding annular lip. The lip rests on a surface of a bottom member that is connected to the outer cylinder 92. The lip comprises a number of openings 98 that partially define passages between a lower inner chamber 100 defined in the inner cylinder 90 and an outer chamber 102 defined between the inner cylinder 90 and the outer cylinder 92.

With continued reference to FIG. 3, the bottom plate 94 forms a valve seat with a number of holes also extending through the relatively flat plate member. Preferably, two sets of holes are defined with a first set of holes 104 providing for flow from the lower inner chamber 100 through the passages into the outer chamber 102 and a second set of holes 106 providing for flow from the outer chamber 102 through the passages into the lower inner chamber 100.

Figure 4:
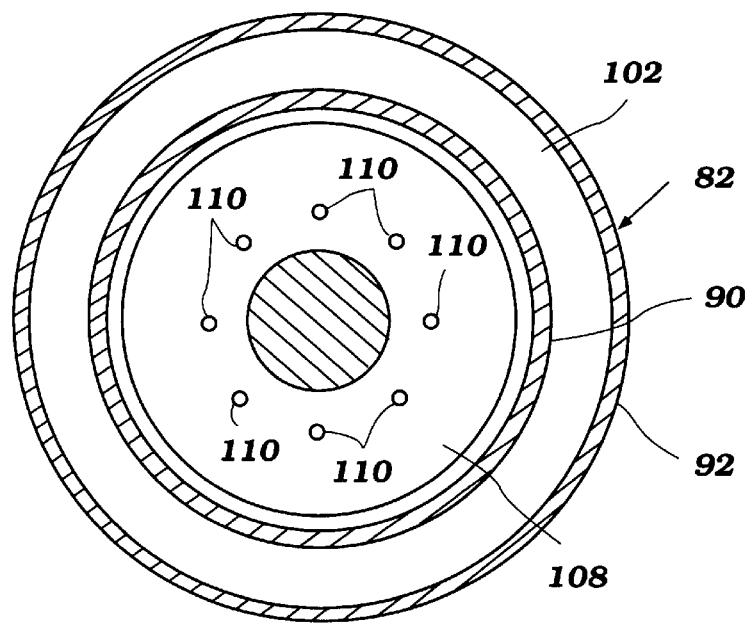
FIG. 4 is an enlarged cross sectional view of the hydraulic damper of FIG. 3 taken along the line 4—4.

As will be appreciated, flow is controlled through the holes 104, 106 in a suitable manner. For instance, in the illustrated arrangement a first sheet-shaped valve 108 is disposed on an upper surface of the bottom plate 94. The valve 108, as illustrated in FIG. 4, comprises a number of holes 110 that allow fluid to readily pass through the valve 108 into the holes 104. Of course, some of the force from fluid moving toward the valve 108 will impinge upon the surface of the valve 108 and urge it against the bottom plate 94 for reasons that will become apparent. Moreover, in the illustrated arrangement, a Belville washer or other biasing member 112, such as a compression spring, is used to register the valve 108 against the surface of the bottom plate 94.

A second sheet-shaped valve 114 rests against a portion of a lower surface of the bottom plate 94. Advantageously, this valve does not require openings through which fluid can pass. Rather, in the illustrated arrangement, this valve 114 is sized to cover only the openings 104 such that the openings 106 are exposed. This valve 114 also can be biased against the bottom plate 94 if desired. The valves 108, 114 can be manufactured of any suitable material.

As will be explained below, during operation, fluid can pass through the holes 110 into the holes 104 where the pressure opens the valve 114 to flow through the passages into the outer chamber 102 and fluid can pass directly into the holes 106 from the passages to generate pressure that opens the valve 108 to flow into the lower inner chamber 100.

With reference again to FIG. 3, the interior of the inner cylinder 90 is generally segregated into the lower inner chamber 100 and an upper inner chamber 116. Preferably a piston head 118 substantially separates the two chambers 100, 116 from each other. The piston head 118 in the illustrated arrangement is arranged for generally free sliding within the interior of the inner cylinder 90. An outer bushing or sealing ring 120 preferably extends around the outer periphery of the piston head 118 to form a sliding surface that substantially seals with the inner surface of the inner cylinder 90. In the illustrated arrangement, the bushing or ring 120 is disposed between a pair of ribs that retain the bushing or ring in position on the piston head 118.

With continued reference to FIG. 3, the piston head 118 comprises a number a holes that extend in a generally axial direction through the piston head 118. In the illustrated arrangement, the holes are formed in a first set of holes 122 and a second set of holes 124. The sets of holes 122, 124 may comprise as few as one hole or more than one hole. Preferably, the two sets of holes 122, 124 are axially staggered from one another. In other words, the openings at either end of the holes 122, 124 are offset such that the first set of holes 122 has an upper opening and a lower opening that are lower than an upper opening and a lower opening of the second set of holes 124.

Similar to the bottom plate 94, the sets of holes 122, 124 are selectively closed by a first sheet valve 126 and a second sheet valve 128 respectively. Of course, other valve members, such as that discussed above, also can be used. The valve members 126, 128 close one end of each set of holes 122, 124 respectively. In this manner, flow occurs through the first set of holes 122 from the upper inner chamber 116 to the lower inner chamber 100 and flow occurs through the second set of holes 124 from the lower inner chamber 100 to the upper inner chamber 116. The fluid flowing into the holes 122, 124 acts against the valves 126, 128, respectively, to open the valves and allow flow to occur.

Of course, sizing the holes 122, 124 and/or the valves 126, 128 can alter flow characteristics from one chamber to the other. Furthermore, the valves 126, 128 can be biased using any suitable technique, including but not limited to springs, Belville washers and the like. It should be noted that flow characteristics need not be identical or even similar in both directions. For instance, flow may be easier in one direction than in the other.

In the illustrated arrangement, a set of washers 130, 132 secure the piston head 118 to a piston rod 134. The piston rod 134 preferably has a stepped configuration such that the piston head 118 can be positioned over a reduced diameter portion. This constructions reduces the crossing profile of the piston head and piston rod combination and enables the damper 82 to have a reduced diameter overall. In addition, this construction reduces the diameter of the piston head 118 and results in more rigidity to the system.

The piston rod 134 is inserted into the illustrated damper 82 from one end and extends outward from that end of the damper 82. More particularly, the piston rod 134 preferably extends outward from the interior of the inner cylinder 90 through a guide member 136 and an end cap 138. In the illustrated arrangement, a seal 140 is disposed in the end cap 138 and forms a liquid and air tight seal with the sliding piston rod 134. Of course, the seal 140 could be mounted in the guide member 136, between the guide member 136 and the end cap 138 or in any other suitable location. Preferably, the seal 140 is positioned in a recess in the outer portion of the end cap 138 and is locked in position by a lip formed in the outer cylinder 92 of the damper 82.

With continued reference to FIG. 3, the guide member 136 preferably includes at least one passage that connects the outer chamber 102 with the upper inner chamber 116. In the illustrated arrangement, a number of passages 142 extend at an angle radially to connect the two chambers. In addition, a passage extends alongside the piston rod 134 through the guide member 136. Oil or other liquids therefore can pass between the chambers under overflow situations in the upper inner chamber 116. The guide member 136 also includes a retaining boss in the illustrated arrangement. The retaining boss provides support to the inner cylinder 90 and, in the illustrated arrangement, the retaining boss is positioned and configured to place the cylinders 90, 92 in coaxial relation with each other.

With reference again to the piston rod 134, the piston rod preferably is hollow. In the illustrated arrangement, the piston rod 134 comprises a passage 148 that is defined by an inner wall 150 of the piston rod 134. A sub-piston rod 152 extends partially into the passage 148. The outside diameter of the sub-piston rod 152 desirably is slightly smaller than the inside diameter of the passage 148 of the piston rod 134, and therefore a small annular lumen is defined between the two components. Because a gap is provided between the passage 148 in the piston rod 134 and the sub-piston rod 152 of each hydraulic damper, the sliding resistance of the sub-piston rod 152 is lowered, and substantially less distortion is likely to occur between the two components even if the coaxial accuracy between the sub-piston rod 152 and the piston rod 134 is poor.

The sub-piston rod 152 preferably is inserted upward into the downward depending piston rod 134. The lower end of the sub-piston rod 152 in the illustrated arrangement is secured in position against an upper surface of a stop member 154, which is positioned within the bottom plate 94. The top end of the sub-piston rod 152 preferably is integrally formed into a sub-piston 156. Of course, the sub-piston 156 also can be attached to the sub-piston rod 152 in any suitable manner. Integrally forming the sub-piston and the sub-piston rod 152, however, adds strength to the component. Because the end of the sub-piston rod 152 of each hydraulic damper is not secured to the cylinder 88 in the preferred arrangement but rests on the top surface of the stop member 154, even if the cylinder 88 is deformed by a great lateral force, such a deformation does not affect the sub-piston rod 152, enabling smooth sliding of the piston rod 134 and the sub-piston rod 152.

The sub-piston 156 is inserted into the passage 148 of the piston rod 134 with a slight gap being formed between the two components. An o-ring 158 preferably is disposed about the sub-piston 156 to seal against the inner wall 150 of the piston rod 134. Of course, other sealing arrangements also can be used, such a lip seals and the like. It should also be mentioned that a sealing ring 160 is positioned at the end of the piston rod 134 in the illustrated arrangement. The sealing ring 160 forms a seal about the sub-piston rod 152. Preferably, either the inner wall 150 or the sealing ring 160 includes a number of grooves such that a labyrinth seal is formed when the sealing ring 160 is press-fit into place. The labyrinth seal allows fluid communication across the region of the sealing ring 160.

With reference still to FIG. 3, a number of oil chambers are formed in the illustrated damper 82. For instance, an elongate chamber 162 is formed in the passage above the sub-piston 156. The interior of the inner cylinder 90 of the cylinder 88 is divided by the piston head 118 into the upper inner chamber 116 and the lower inner chamber 100. The outer chamber 102 is formed between the inner and outer cylinders 90, 92 of the cylinder 88, and is connected through the passages through the bottom plate 94 to the lower inner chamber 100. These chambers all contain oil or lubricant in the preferred arrangement. The lower portion 164 of the outer chamber 102 preferably contains the same oil or lubricant while the upper portion 166 preferably contains a gas, such as an inert gas, which acts as a pressurizable balancing component. Of course, other fluids can be used and the fluid contained within the elongate chamber 162 can be different from that of the other fluid containing chambers if the two fluids are not mixable or the elongate chamber 162 is physically separated from the other chambers.

With reference again to FIG. 2, the illustrated pressure regulator 86 generally comprises a dual diameter cylinder 180. This cylinder 180 comprises a larger diameter lower portion 182 and a reduced diameter upper portion 184 in the illustrated arrangement. Preferably, the two portions are generally cylindrical in shape and share a common axis.

A pair of piston heads, a larger lower piston head 186 and a smaller upper piston head 188 are disposed within the lower portion 182 and the upper portion 184, respectively. The pistons substantially segregate three chambers: an upper chamber 190, a lower chamber 192, and a gas chamber 194. The gas chamber 194 preferably is enclosed by a cap 195 and can be provided with fittings for charging in some applications. As can be seen, in the illustrated arrangement, the two piston heads 186, 188 are linked together by a connecting rod portion 196. The connecting rod portion 196 ties the piston heads together for movement within the respective cylinder portions 182, 184.

Figure 5:
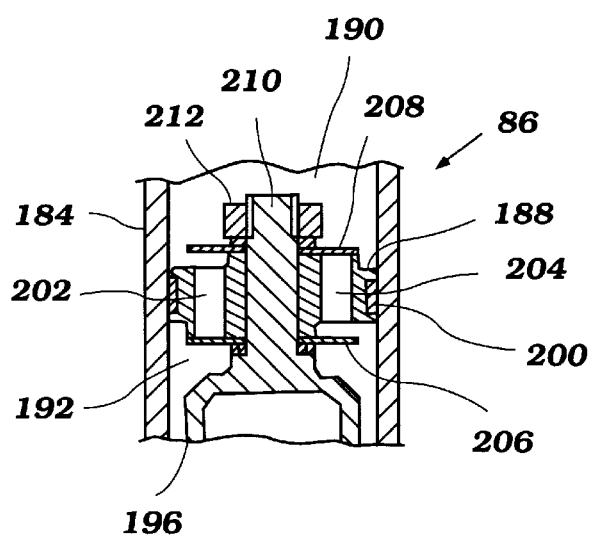
FIG. 5 is an enlarged cross sectional view of a portion of the pressure regulator of FIG. 2 taken along the circle 5—5.

With reference now to FIG. 5, the upper piston head 188 is constructed in a manner similar to the piston 118 of the damper. In particular, the upper piston head 188 generally comprises a sealing ring or bushing 200 that extends around the periphery of the piston head 188 and which is secured in position with upset ribs.

With continued reference to FIG. 5, the piston head 188 comprises a number a holes that extend in a generally axial direction through the piston head 188. In the illustrated arrangement, the holes are formed in a first set of holes 202 and a second set of holes 204. The sets of holes 202, 204 may comprise as few as one hole or more than one hole. Preferably, the two sets of holes 202, 204 are axially staggered from one another. In other words, the openings at either end of the holes 202, 204 are offset such that the first set of holes 202 has an upper opening and a lower opening that are lower than an upper opening and a lower opening of the second set of holes 204.

The sets of holes 202, 204 are selectively closed by a first sheet valve 206 and a second sheet valve 208 respectively. Of course, other valve members, such as that discussed above, also can be used. The valve members 206, 208 close one end of each set of holes 202, 204 respectively. In this manner, flow occurs through the first set of holes 202 from the upper chamber 190 to the lower chamber 192 and flow occurs through the second set of holes 204 from the lower chamber 192 to the upper chamber 190. The fluid flowing into the holes 202, 204 acts against the valves 206, 208 respectively, to open the valves and allow flow to occur.

Of course, sizing the holes 202, 204 and/or the valves 206, 208 can alter flow characteristics from one chamber to the other. Furthermore, the valves 206, 208 can be biased using any suitable technique, including but not limited to springs, Belville washers and the like. It should be noted that flow characteristics need not be identical or even similar in both directions. For instance, flow may be easier in one direction than in the other. In the illustrated arrangement, the piston head 188 and the valves 206, 208 are secured over a threaded portion 210 of the connecting rod portion 196 with a nut 212. Other suitable connecting techniques apparent to those of ordinary skill in the art also can be used. In addition, washers can be positioned as desired.

As described above, the interior of the cylinder 180 is divided by the free piston assembly (i.e., the lower head 186, the upper head 188 and the connecting rod portion 196) into a pair of oil chambers and a gas chamber 194. The pair of oil chambers comprise the upper oil chamber 190 and the lower oil chamber 192. The oil chambers 190, 192 in the illustrated arrangement are filled with oil while the gas chamber 194 is filled with an inert gas and sealed.

With reference to FIG. 2, the upper chamber 190 is connected through a first communication passage 214 and a nipple 216 to the elongate oil chamber 148 of the hydraulic damper 84 on the right hand side. The lower chamber 192 is connected through a second communication passage 218 and a nipple 220 to the elongate oil chamber 148 of the hydraulic damper 82 on the left hand side. Of course, the passages can be formed by metal tubing, flexible tubing, elastameric tubing or any other suitable configuration. In addition, any suitable coupling can be used in place of the illustrated nipple. In some arrangements, quick-release couplings can be used while, in other arrangements, other types of fittings are used.

In one preferred arrangement, the pressure regulator 86 is mounted in a suitable location on the body or chassis of the vehicle with which it is used. The piston rods 134 also are connected to the vehicle body or, more preferably, the chassis of the vehicle. Each cylinder 88 then is connected to the wheel that is to be suspended and damped. In one arrangement, the right front wheel and the left front wheel are paired and interrelated through the pressure regulator 86. Because the piston rod 134, in which the elongate oil chamber 162 is formed, is connected to the vehicle body, the communication passages 214, 218 interconnecting the elongate oil chamber 162 and the oil chambers 190, 192 of the pressure regulator 86 also can be secured to the vehicle body. Thus, the passages 214, 218 will not be substantially affected by oscillation of the wheels and the life of the passages (and any tubing or piping forming them) can be substantially improved.

When a vehicle having a suspension system arranged and configured in accordance with certain aspects of the present invention operates on a road, the two damped wheels move up and down to follow operating surface irregularities. During the movement, the cylinders 88 and the associated piston rods 134 of each hydraulic damper 82, 84 extend or retract. For instance, when the two wheels roll over a single bump, the cylinders 88 initially move upward by about the same distance relative to the piston rods 134 and the sub-piston rods 152 also move up relative to the piston rods 134. This movement would likely compress a spring member that often will be used in combination with a damper.

When the piston rod 134 moves down relative to the cylinder 88, the piston 118 and the piston rod 134 move downward within the inner cylinder 90. As a result, oil in the lower inner chamber 100 flows through the hole 124 formed in the piston 118, pushes and opens the valve 128, and flows to the upper inner chamber 116. At the same time, the amount of oil corresponding to the volume of the portion of the piston rod 134 which moves into the inner cylinder 90, flows through the holes 110 formed in valve 108 and through holes 104 that extend through the bottom plate 94. The oil pushes and opens the valve 114 and flows through the passages, including the openings 98 that are formed in the bottom plate 94, into the outer chamber 102 formed between the inner cylinder 90 and the outer cylinder 92. As a result, the surface level of the oil in the outer chamber 102 rises due to the volume of the portion of the piston rod 134 that has moved downward into the inner cylinder 134. The displaced fluid is balanced by the compression of the gas contained in the upper portion 166 of the outer chamber 102.

Simultaneous with the compression of the gas, the sub-piston rod 152 and the sub-piston 156 move upward within the passage 148 formed in the piston rod 134. Accordingly, oil in elongate oil chamber 162 flows through the communication passages 214, 218 to the upper and lower oil chambers 190,192 of the pressure regulator 86. The amount of oil sent to the upper and lower oil chambers 190, 192 can be determined by multiplying the cross-sectional area of the elongate oil chamber 162 by the stroke of the sub-piston 156. Because the cross-sectional area of the elongate oil chamber 162 advantageously is small, the amount of oil sent to the upper and lower oil chambers 190, 192 is substantially smaller than the volume of the portion of the piston rod 134 that enters the inner cylinder 90.

When oil is sent to the upper and lower oil chambers 190, 192, as described above, the two piston heads 186, 188 move downward in the cylinder 180 together. Preferably, the sizing of the components is such that the volume of both chambers 190, 192 is substantially the same. In particular, in the illustrated arrangement, the step formed in the lower chamber 192 allows downward movement of the piston assembly 186, 188, 196 caused by increasing volumes in the upper chamber 190 to cause a corresponding increase in volume in the lower chamber 192 even though the piston assembly 186, 188, 196 fixes the spacing between the pistons 186, 188. In this manner, minimal oil flows through the piston 188 between the chambers 190, 192. Oscillation of the vehicle body thus is attenuated with damping forces produced almost exclusively by the valves within the respective hydraulic dampers 82, 84 with slight if any input from the valves in the pressure regulator. In this way, the ride comfort in the four-wheeled vehicle is improved.

When the paired wheels move differing amounts or in differing directions, however, the movement is damped both in the dampers and in the pressure regulator. For example, when one hydraulic damper 82 contracts and the other hydraulic damper 84 extends (i.e., such as when the vehicle turns right), the volume of the portion of the piston rod 134 of the hydraulic damper 82 that moves into the inner cylinder 90 is compensated for by compression of the gas, and concurrently, oil in the elongate oil chamber 148 is sent through the communication passage 218 to the lower chamber 192 of the pressure regulator 86. In the other hydraulic damper 84, oil in the upper inner 116 flows through the piston 118, which opens the valve 126, and the oil flows into the lower inner chamber 100. At the same time, an amount of oil corresponding to the volume of part of the piston rod 134 that moves out of the cylinder 88 flows from the outer chamber 102 through the communication passages (i.e., holes 98, 106) through the valve 108 into the lower inner chamber 100. At the same time, since the sub-piston rod 152 and the sub-piston 156 move downward relative to the piston rod 134, oil is drawn from the upper oil chamber 190 of the pressure regulator 86 to the elongate oil chamber 162 formed in the piston rod 134.

In the pressure regulator 86, because part of the oil entering the lower oil chamber 192 flows through the oil hole 204 in the piston 188 to open the valve 208 into the upper oil chamber 190, a damping force is also produced by the pressure regulator 86 in addition to the damping forces produced by respective hydraulic dampers 82, 84. As a result, extension and contraction movements of respective hydraulic dampers 82, 84 are restricted, and rolling of the vehicle body during turning is restricted.

As will be understood, in dampers constructed in accordance with one aspect of the present invention, the increase or decrease in the amount of oil in the chambers of the inner cylinder 90, which is caused by the movement of the piston rod 134 into or out of the cylinder 88, is compensated for by the compression or expansion of the gas contained in the outer chamber 102 of the hydraulic damper. The increase or decrease in the amount of oil in the elongate oil chamber 162 caused by the reciprocal movement of the small diameter sub-piston rod 152 toward and away from the elongate oil chamber 162 is absorbed by the pressure regulator 86. In this case, as described above, since the cross-sectional areas of the sub-piston rod 152 and the elongate oil chamber 162 are smaller than that of the piston rod 134, the volume displaced into or withdrawn from the pressure regulator 86 can be small even if the diameter of the piston rod 134 is great. As a result, the size and cost of the pressure regulator 86 can be reduced, and a great degree of freedom can be secured in mounting the pressure regulator 86 on the vehicle.

While the above description and the figures illustrated an arrangement in which an outer cylinder and an inner cylinder are used to define the chambers of the damper, other arrangements also can be used. For instance, in some arrangements, the damper may comprise a single cylinder that is divided into an upper chamber and a lower chamber by a piston similar to that disclosed in the context of the inner cylinder. Rather than placing one of the upper chamber and the lower chamber in communication with a chamber defined between an inner cylinder and an outer cylinder, the chamber can communicate with a subchamber. The subchamber can be remotely located relative to the main cylinder. In such configurations, the subchamber and the chamber can be connected with a fluid passage that can include a valving arrangement. Of course, this subchamber also can be in physical contact with the main cylinder is other arrangements. The subchamber then may be divided into a gas chamber and a liquid chamber by a piston or other suitable member such that the subchamber functions generally the same as the outer chamber of the illustrated embodiments.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle suspension system comprising a first hydraulic damper and a second hydraulic damper, said first hydraulic damper comprising a first inner cylinder and a first outer cylinder, said first inner cylinder and said first outer cylinder being arranged coaxially, said second hydraulic damper comprising a second inner cylinder and a second outer cylinder, said second inner cylinder and said second outer cylinder being arranged coaxially, a first piston rod being at least partially positioned within said first inner cylinder, a second piston rod being at least partially positioned within said second inner cylinder, a first sub-piston rod being at least partially disposed within said first piston rod and being capable of axial movement relative to said first piston rod, a first piston rod chamber having a variable volume and being defined by at least a portion of said first piston rod and said first sub-piston rod, a second sub-piston rod being at least partially disposed within said second piston rod and being capable of axial movement relative to said second piston rod, a second piston rod chamber having a variable volume and being defined by at least a portion of said second piston rod and said second sub-piston rod, a pressure regulator comprising a first chamber and second chamber, said first chamber being in fluid communication with said first piston rod chamber and said second chamber being in fluid communication with said second piston rod chamber.

2. The vehicle suspension system of claim 1 further comprising a piston disposed within said pressure regulator and dividing said pressure regulator into said first chamber and said second chamber.

3. The vehicle suspension system of claim 2, wherein said piston further divides said pressure regulator into a third chamber.

4. The vehicle suspension system of claim 1, further comprising a first piston that is connected to said first piston rod, said first piston being mounted for translation within said first inner cylinder and dividing said first inner cylinder into a first upper chamber and a first lower chamber.

5. The vehicle suspension system of claim 4, further comprising a second piston that is connected to said second piston rod, said second piston being mounted for translation within said second inner cylinder and dividing said second inner cylinder into a second upper chamber and a second lower chamber.

6. The vehicle suspension system of claim 5, wherein said first lower chamber is in fluid communication with said first piston rod chamber.

7. The vehicle suspension system of claim 6, wherein said second lower chamber is in fluid communication with said second piston rod chamber.

8. The vehicle suspension system of claim 7, wherein a first outer chamber is formed between said first inner and outer cylinders and wherein said first outer chamber is in fluid communication with at least one of said first upper and lower inner chambers.

9. The vehicle suspension system of claim 8, wherein said first outer chamber comprises a first lower outer chamber and a first upper outer chamber.

10. The vehicle suspension system of claim 8, wherein a second outer chamber is formed between said second inner and outer cylinders and wherein said second outer chamber is in fluid communication with at least one of said second upper and lower inner chambers.

11. The vehicle suspension system of claim 10, wherein said second outer chamber comprises a second lower oil chamber and a second upper gas chamber.

12. A vehicle suspension system, comprising a first hydraulic damper comprising a first inner cylinder and a first outer cylinder, a first piston slidably engaged in said first inner cylinder, a first hollow piston rod being connected to one end of said first piston, a first sub-piston rod and a first sub-piston formed on said first sub-piston rod are slidably disposed at least partially within said first piston rod, and a first elongate chamber being defined within said first piston rod, said first elongate chamber being variable in volume, a second hydraulic damper comprising a second inner cylinder and a second outer cylinder, a second piston slidably engaged in said second inner cylinder, a second hollow piston rod being connected to one end of said second piston, a second sub-piston rod and a second sub-piston formed on said second sub-piston rod being slidably disposed at least partially within said second piston rod, and a second elongate chamber being defined within said second piston rod, said second elongate chamber being variable in volume, a pressure regulator comprising a first pressure chamber and a second pressure chamber, said first pressure chamber being connected to said first elongate chamber and said second pressure chamber being connected to said second elongate chamber.

13. The suspension system of claim 12, wherein said first elongate chamber is substantially sealed from said first inner cylinder.

14. The suspension system of claim 12, wherein said second elongate chamber is substantially sealed from said second inner cylinder.

15. The suspension system of claim 12, wherein said first piston rod is adapted for mounting to a vehicle body and said first outer cylinder is adapted for mounting to a vehicle wheel.

16. The suspension system of claim 12, wherein said second piston rod is adapted for mounting to a vehicle body and said second outer cylinder is adapted for mounting to a vehicle wheel.

17. The suspension system of claim 12, wherein a lower end of said first sub-piston rod rests upon a portion of said first outer cylinder.

18. The suspension system of claim 17, wherein said portion of said first outer cylinder comprises a stopper inserted through a bottom plate of said first damper.

19. The suspension system of claim 18, wherein a lower end of said second sub-piston rod rests upon a portion of said second outer cylinder.

20. The suspension system of claim 19, wherein said portion of said second outer cylinder comprises a stopper inserted through a bottom plate of said second damper.

21. A damper for a suspension system, said damper comprising an outer cylinder housing, a first chamber, a second chamber, and a third chamber defined within said outer cylinder housing, said first chamber having a smaller volume than said second chamber and said third chamber, said third chamber extending around at least a portion of said second chamber and a valved passage placing said second chamber and said third chamber in selective fluid communication with each other, said first chamber being in fluid communication with a pressure regulator and a second damper being in fluid communication with said pressure regulator.

22. The damper of claim 21 further comprising a fourth chamber, said fourth chamber and said third chamber being in substantially complete fluid communication with each other, said fourth chamber being adapted to contain a compressible substance and said third chamber being adapted to contain varying volumes of a non-compressible substance.

23. The damper of claim 22, wherein said first chamber and said second chamber are in fluid communication.

24. The damper of claim 21, wherein said first chamber is adapted to contain a substantially non-compressible fluid.

25. The damper of claim 24 in combination with a second damper and means for accommodating fluid displaced from said first chamber.

26. The damper of claim 25, wherein said means for accommodating fluid displaced from said first chamber further serves as means for supplying fluid to said first chamber.

27. A damper comprising a cylinder and a piston slidably disposed within said cylinder, said piston dividing said cylinder into an upper chamber and a lower chamber, a piston rod connected to said piston and being at least partially positioned within said upper chamber, said piston rod comprising an axial passageway such that said piston rod is substantially hollow, a sub piston rod at least partially disposed in said lower chamber extending into said axial passageway of said piston rod, a sub piston being disposed along said piston rod, an elongate chamber being at least partially defined within said piston rod by said sub piston, and a sub chamber being in fluid communication with said lower chamber.

28. The damper of claim 27 further comprising a second cylinder that extends around said cylinder and that is generally coaxial with said cylinder, said sub chamber being defined, at least in part, between said cylinder and said second cylinder.

29. The damper of claim 27, wherein said sub chamber and said elongate chamber are not in fluid communication with each other.

30. The damper of claim 27, wherein said lower chamber and said elongate chamber are not in fluid communication with each other.

31. The damper of claim 27, wherein said sub piston is connected to an end of said sub piston rod.

32. The damper of claim 27, wherein said sub piston is unitarily formed with said sub piston rod and is disposed at an end of said sub piston rod.

* * * * *